(12) United States Patent
Kobayashi

(10) Patent No.: US 9,560,803 B2
(45) Date of Patent: Feb. 7, 2017

(54) WEED TRIMMER AND EDGER ATTACHMENT FOR RIDING LAWNMOWERS

(71) Applicant: Herbert S Kobayashi, Webster, TX (US)

(72) Inventor: Herbert S Kobayashi, Webster, TX (US)

( * ) Notice: Subject to any disclaimer, the term of this patent is extended or adjusted under 35 U.S.C. 154(b) by 246 days.

(21) Appl. No.: 14/314,403

(22) Filed: Jul. 15, 2014

(65) Prior Publication Data

US 2016/0014958 A1    Jan. 21, 2016

(51) Int. Cl.
*A01D 34/00* (2006.01)
*A01D 43/16* (2006.01)

(52) U.S. Cl.
CPC .................................. *A01D 43/16* (2013.01)

(58) Field of Classification Search
CPC .. A01D 34/84; A01D 34/416; A01D 34/4166; A01D 34/4161–34/4163; A01D 43/16; A01D 34/4165; A01D 34/64
USPC .......................................................... 56/12.7
See application file for complete search history.

(56) References Cited

U.S. PATENT DOCUMENTS

| | | | |
|---|---|---|---|
| 3,192,693 A | | 7/1965 | Bergeson |
| 4,077,191 A | * | 3/1978 | Pittinger, Sr. ........ A01D 34/416 30/276 |
| 4,091,536 A | * | 5/1978 | Bartholomew .... A01D 34/4161 30/276 |
| 4,107,901 A | * | 8/1978 | Moore ............... A01D 34/4161 30/347 |
| 4,131,045 A | * | 12/1978 | Peterson .................. B26D 1/04 30/276 |
| 4,271,594 A | * | 6/1981 | Kilmer ............... A01D 34/4161 30/276 |
| 4,453,372 A | | 6/1984 | Remer |
| 4,882,896 A | * | 11/1989 | Wilcox .................. A01D 69/02 56/10.5 |
| 5,167,108 A | * | 12/1992 | Bird ....................... A01D 43/16 56/10.4 |
| 5,174,100 A | * | 12/1992 | Wassenberg ......... A01D 34/416 56/12.1 |
| 5,651,418 A | * | 7/1997 | Jerez .................... A01D 34/416 172/14 |
| 6,786,030 B2 | * | 9/2004 | Nafziger ................ A01D 43/16 56/12.7 |

(Continued)

*Primary Examiner* — Thomas B Will
*Assistant Examiner* — Mai Nguyen
(74) *Attorney, Agent, or Firm* — Kenneth L. Nash

(57) ABSTRACT

A weed trimmer and edger apparatus and method for cutting, edging, and lawn maintenance in general. In one embodiment, the apparatus is an attachment for a riding lawnmower. At least one belt and pulley attach to the lawnmower to power and rotate a cutting head arrangement, which is supported by a bracket attached to the lawnmower. In another embodiment, the apparatus is a standalone portable weed trimmer and edger apparatus with a cutting head arrangement powered by an electric motor. The cutting head arrangement may comprise a rotating shaft contained within a stationary housing with a disc attached to an underside portion of the shaft. Weed eater line descends from a storage housing on an upper portion of the apparatus through a feed mechanism which advances or retracts weed eater line through the apparatus.

17 Claims, 3 Drawing Sheets

(56) References Cited

U.S. PATENT DOCUMENTS

| | | | |
|---|---|---|---|
| 7,549,278 B2 * | 6/2009 | McMahan | A01D 34/84 56/13.7 |
| 7,877,971 B1 * | 2/2011 | Hallinan | A01D 34/84 56/10.4 |
| 7,900,428 B1 | 3/2011 | Maldonado | |
| 7,975,459 B1 | 7/2011 | Murawski | |
| 8,302,372 B1 | 11/2012 | Eubanks | |
| 8,322,121 B1 | 12/2012 | Marcell | |
| 8,464,504 B1 | 6/2013 | Huff | |
| 2004/0154277 A1 | 8/2004 | Shumate | |
| 2006/0005520 A1 * | 1/2006 | Weidman | A01D 69/00 56/12.7 |
| 2010/0326031 A1 | 12/2010 | Branden | |

* cited by examiner

WEED TRIMMER AND EDGER ATTACHMENT FOR RIDING LAWNMOWERS

BACKGROUND OF THE INVENTION

Field of the Invention

The present invention relates generally to lawn mower attachments, and more specifically to a weed trimmer and edger attachment for riding lawnmowers.

Background of the Invention

Lawn maintenance and upkeep is a common concern in many residential and commercial settings. This maintenance may include cutting grass, trimming weeds, edging along fence lines or property boundaries, and the like. Oftentimes, there is numerous equipment to accomplish the many tasks associated with lawn maintenance, including a lawn mower, an edger, a weed trimmer or weed eater, a blower, and the like. This equipment requires maintenance itself and can be cumbersome to handle and transport.

Large areas are more problematic, because of the increased area needed to be reached by the weed trimmer and the need to haul this equipment around the property. Furthermore, these devices generally feed the cutting string from a position below the cutting axis, such as storing the cutting string in a head portion which fastens to the rest of the machine with the cutting string deployed through various orifices. While weed eater attachments can be utilized with lawn mowers and the like, the resulting devices can be problematic.

Prior art weed eaters provide a feed for additional string as the string is worn that is provided in a supply beneath the weed eater machine. The position of the supply can be problematic if feed problems arise due to difficulty of access to the feed supply for a riding weed eater mower attachment.

Numerous attempts to produce a weed trimmer and edger attachment for lawnmowers exist in the prior art. The following patents discuss background art related to the above discussed subject matter:

U.S. Pat. No. 8,464,504, issued Jun. 18, 2013 to Huff, discloses a combination edger and trimmer for mounting on a riding lawn mower's deck. The edger/trimmer comprises a deck mount plate, an intermediate plate and a motor mount plate. The three plates are offset from one another with the intermediate plate hingeably attached to the deck mount plate and also to the motor mount plate. An electric motor with a cutting head is attached to the motor mount plate. The edger/trimmer is positioned in rest, edging, or trimming positions by manually moving the plates about their hinge points.

U.S. Pat. No. 8,322,121, issued Dec. 4, 2012 to Marcell, discloses an electric trimmer attachment for lawn tractors comprising an attachable apparatus for use with existing lawn tractors which provides trimmer capabilities. The apparatus comprises a mounting bracket, an arm, and a line trimmer. The mounting bracket provides a means for removably securing the device to a deck of an existing mower. The arm comprises a gooseneck arm attached to the bracket, which extends outwards. An outside end portion of the arm comprises a line trimmer with an electric motor and features such as automatic line advancement and safety controls. The motor is powered via a converter or battery pack on the mower. The arm provides an arc-shaped rotating motion to the trimmer.

U.S. Pat. No. 8,302,372, issued Nov. 6, 2012 to Eubanks, teaches an auxiliary trimmer for a lawnmower including a mounting plate removably fastened to a lawnmower deck. Attached to the mounting plate is a trimmer housing having a shaft extending therefrom. At a distal end of the shaft is a trimmer spool that is driven by the lawnmower blade with a series of belts and pulleys. On the rear surface of the trimmer housing is an adjustment ring having a plurality of notches thereon. A spring-biased latch on an end of the shaft releasably fits within any one of the notches on the adjustment ring to position the trimmer spool at a select angular orientation. A pivotal handle raises and lowers the trimmer spool to a desired elevation.

U.S. Pat. No. 7,900,428, issued Mar. 8, 2011 to Maldonado, discloses a gear assembly which may have a first gear attached to a gear shaft and a second gear attachable to a powered rotating element of a mowing machine. An attachment element may have a shaft hole with the gear shaft rotatably inserted through the shaft hole with one end of the gear shaft positioned in a coupling end of the attachment element. A trimming device with a trimmer tube open at a first end and an end of a shaft of the trimming device with a shaft socket fitting inserted in the coupling end of the attachment element for the shaft socket fitting to engage the gear shaft. An anti-rotating clamp attached adjacent the first end of the trimmer tube for positioning and retention in a clamp recess in a front face of the coupling end to inhibit rotation of the trimmer tube in the coupling end.

U.S. Pat. No. 4,453,372, issued Jun. 12, 1984 to Remer, teaches a universal grass edger and trimmer attachment utilizing a rotary flexible drive shaft whose operating end is supported by a multipositional boom.

United States Patent App. No. 2010/00326031, published Dec. 30, 2010 to Branden, discloses a device allowing a user to removably attach a weed line trimmer to a lawnmower deck, allowing a user to activate the weed trimmer or automatically engaging during the mowing of a yard to trim areas beside the mower while mowing the yard, eliminating duplicate effort and also to relieve the stress of carrying the weed trimmer.

United States Patent App. No. 2004/0154277, published Aug. 12, 2004 to Shumate, discloses a trimming and edging attachment for all types of riding mowers and garden tractors used for residential and commercial needs. The attachment consist of a mounting plate to mount to the front of the mower with three sections of arms extending outward to the left of said mower and just ahead of the left front wheel. The trim head is powered from an engage mechanism with a drive belt off of the main shaft of the mower motor. The power of the pneumatic cylinders that operate the up and down motion of the arms comes from a twelve volt dc motor and pump combination. This pump is an on demand pump and only operates when some type of adjustment or movement is needed. This unit does not depend on the mowing deck to be in operation while using the trim and edge attachment.

There exists a need for an improved weed trimmer attachment for riding lawnmowers. Consequently, those skilled in the art will appreciate the present invention.

SUMMARY OF THE INVENTION

A primary object of the present invention is to provide an improved weed trimmer and edger apparatus.

Another object of the present invention is to provide an improved weed trimmer and edger attachment for riding lawnmowers.

Yet another object of the present invention is to provide a weed trimmer and edger attachment apparatus for riding lawnmowers that provides better access to the string feed mechanism.

Still another object of the present invention is to provide a weed trimmer and edger attachment apparatus for riding lawnmowers with both an automatic and a manual feed.

A further object of the present invention is to provide a weed trimmer and edger attachment apparatus for riding lawnmowers.

These and other objects, features, and advantages of the present invention will become clear from the figures and description given hereinafter. It is understood that the objects listed above are not all inclusive and are only intended to aid in understanding the present invention, not to limit the bounds of the present invention in any way.

In accordance with the disclosure, one embodiment of a weed trimmer and edger apparatus may include, but is not limited to a rotatable shaft and a compartment housing mounted on an upper end of the shaft and at least one cutting line exit on a lower end of the shaft, the compartment housing containing at least one access point to feed at least one strand of cutting line through the rotatable shaft and exiting through the at least one cutting line exit. The apparatus may further comprise a disc fastened to a bottom portion of the shaft, the disc comprising at least one cutting line guide on an outer portion of the disc to receive the at least one strand of cutting line, and a feed mechanism for moving the at least one strand of cutting line through the rotatable shaft, the feed mechanism operable to both extend and retract the at least one strand of cutting line.

The weed trimmer and edger apparatus may further comprise a spring mounted bracket mounted to a lawnmower on one end and attached to a housing on an opposite end, at least one pulley and at least one drive belt operatively configured with the shaft and the lawnmower, whereby the shaft is slave controlled by the at least one drive belt to concentrically rotate within the housing.

In one embodiment, the feed mechanism may further comprise a gearbox comprising at least two feed members, the at least two feed members being controllable for controlling the length of the at least one cutting strand.

In another embodiment, the apparatus may comprise a blade secured around the disc. The apparatus may further comprise a plurality of cutting surfaces extending outward from a perimeter portion of the disc blade.

The weed trimmer and edger apparatus of claim 1, further comprising at least one battery and an electronic switch operatively connected to both the at least one battery and the feed mechanism, whereby the switch electrically controls the feed mechanism to move the at least one strand of cutting line.

In another embodiment, the weed trimmer and edger apparatus may comprise a stationary housing encompassing a lower portion of the shaft, the stationary housing further comprising an electric motor for rotating the shaft, whereby the shaft is driven by the electric motor to concentrically rotate within the stationary housing to engage a surface to be cut.

In yet another embodiment of the present invention, a method for a weed trimmer and edger apparatus is disclosed, which may comprise the steps of providing a shaft, mounting a compartment housing on an upper end of the shaft and at least one cutting line exit on a lower end of the shaft, the compartment housing containing at least one access point to feed at least one strand of cutting line through the shaft and exiting through the at least one cutting line exit, fastening a disc blade to an underside of the shaft, the disc blade comprising at least one cutting line guide on an outer portion of the disc blade to receive the at least one strand of cutting line, and providing a feed mechanism for moving the at least one strand of cutting line through the shaft.

The method may further comprise the step of providing a bracket mounted to a lawnmower on one end and attached to a housing on an opposite end, the housing concentrically encompassing a lower portion of the shaft, and further providing at least one pulley and at least one drive belt operatively configured with the shaft and the lawnmower, whereby the shaft is slave controlled by the at least one drive belt to concentrically rotate within the housing.

The method may include providing the feed mechanism further comprises a gearbox comprising at least two feed members, said at least two feed members being controllable for controlling the length of said at least one cutting strand.

Other steps may include securing a blade around the disc and providing a plurality of cutting surfaces extending outward from a perimeter portion of the disc blade.

Another step may include providing at least one battery and an electronic switch operatively connected to both the at least one battery and the feed mechanism, whereby the switch electrically controls the feed mechanism to move the at least one strand of cutting line.

In one embodiment, the method may comprise providing a stationary housing encompassing a lower portion of the shaft, the stationary housing further comprising an electric motor for rotating the shaft, whereby the shaft is driven by the electric motor to concentrically rotate within the stationary housing to engage a surface to be cut.

In another embodiment, the method may comprise providing a cylindrical member within the shaft for securing the at least one strand of cutting line.

BRIEF DESCRIPTION OF THE DRAWINGS

The above general description and the following detailed description are merely illustrative of the generic invention, and additional modes, advantages, and particulars of this invention will be readily suggested to those skilled in the art without departing from the spirit and scope of the invention. A more complete understanding of the invention and many of the attendant advantages thereto will be readily appreciated by reference to the following detailed description when considered in conjunction with the accompanying drawings, wherein like reference numerals refer to like parts and wherein.

DETAILED DESCRIPTION OF THE PREFERRED EMBODIMENT

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
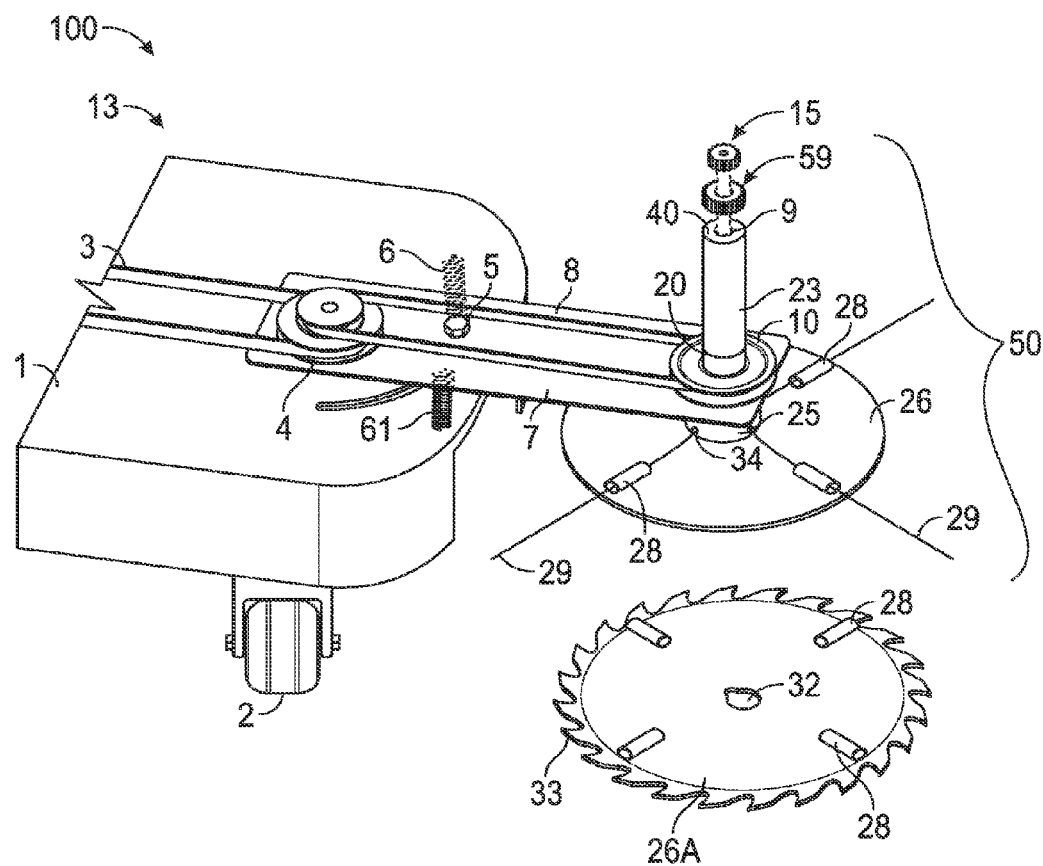
FIG. 1 is a perspective view of a weed trimmer and edger attachment attached to the deck of a riding lawnmower in accord with one possible embodiment of the present invention.
Figure 2A:
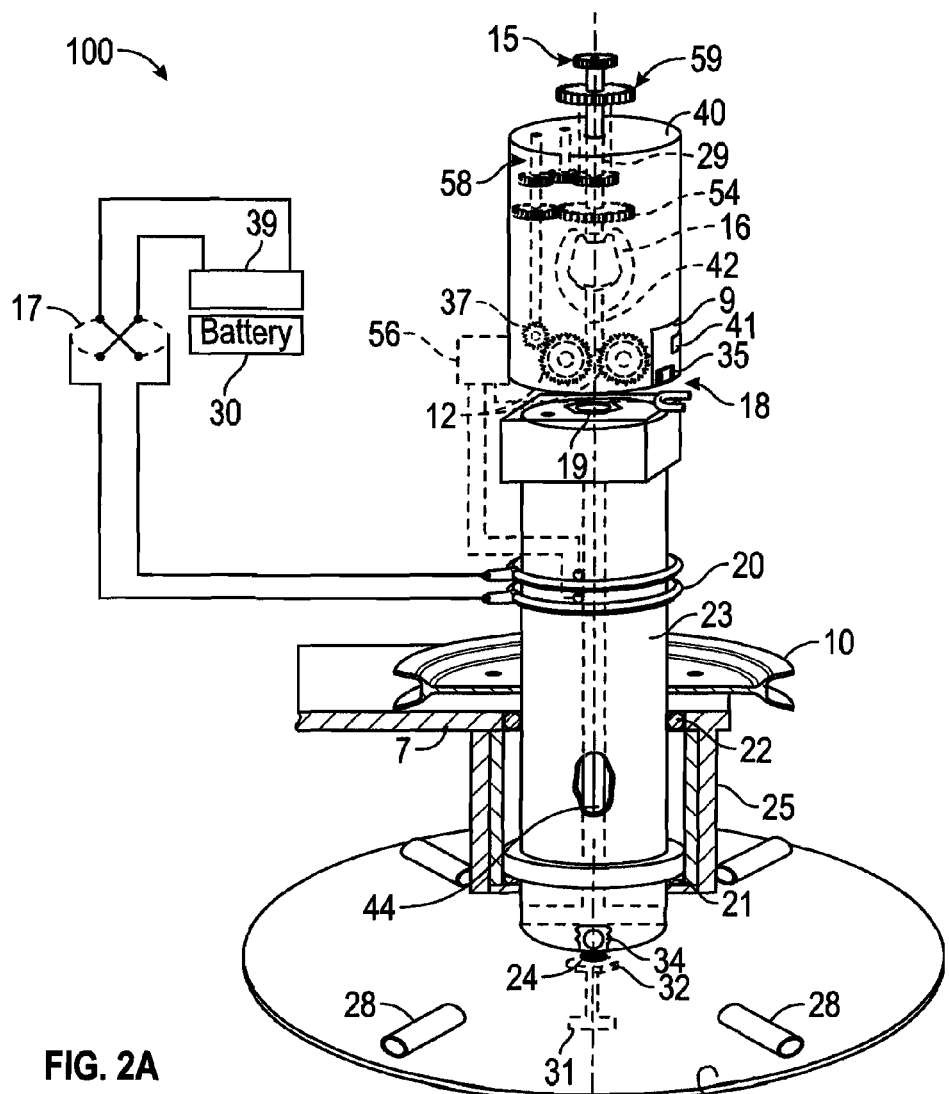
FIG. 2A is a perspective view, partially cut out, of a weed trimmer and edger attachment in accord with one possible embodiment of the present invention.
Figure 3:
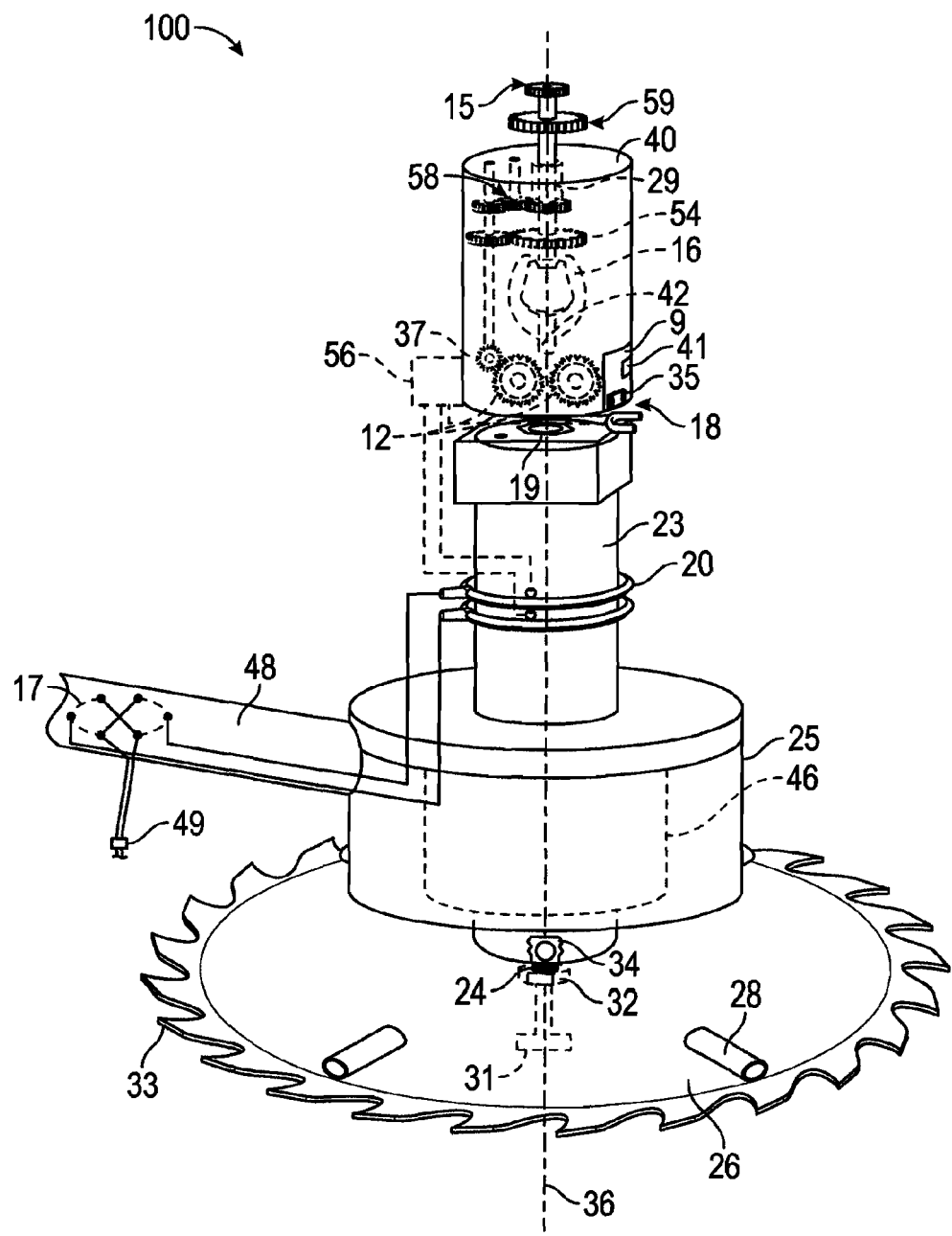
FIG. 3 is a perspective view of a portable weed trimmer and edger attachment in accord with one possible embodiment of the present invention.

In a preferred embodiment, weed trimmer and edger apparatus 100 is fastened as a kit to attach to any standard riding lawnmower as shown in FIG. 1 and FIG. 2A. In alternative embodiments, weed trimmer and edger apparatus 100 could be fashioned as an attachment for a standard push mower or a standalone portable apparatus as shown in FIG. 3.

Turning now to FIG. 1, there is shown a perspective view of weed trimmer and edger apparatus 100 attached to deck 1 of riding lawnmower 13 in accord with one possible embodiment of the present invention. Bolt 5 attaches bracket 7 (See also FIG. 2) to deck 1 of mower 13 to securely position trimmer and edger apparatus 100 outward with respect to mower 13. Springs 6, 61 each connect on one end to deck 1 and on an opposite end to an underside portion of bracket 7 to further stabilize cutting head arrangement 50 during operation. Thus, when the bracket engages an object, the bracket is spring mounted to allow bending back and forth as desired but is otherwise held stable.

A first end of bracket 7 secures trimmer drive pulley 4 to a top portion of mower deck 1, while a distal end of bracket 7 supports housing 25 (See FIG. 2). In this embodiment, bracket 7 is a rectangular shape, but may comprise any shape sufficiently rigid to support cutting head 50. Drive belt 3 is positioned to engage mower drive pulley 4 and mower drive pulley 10 in turn energizes driven pulley 10 through trimmer belt 8 when drive belt 3 rotates drive pulley 4. Driven pulley 10 is configured with rotating tubular or shaft 23, disc blade 26, and housing 25 to provide the power for weed trimmer and edger apparatus 100 to trim or edge lawn areas inaccessible to mower 13. Accordingly, tubular or shaft 23 is rotated.

Disc blade 26 is attached to shaft 23 by bolt 31 (see FIG. 2A) which extends through recess 32 as described in more detail hereinafter in reference to FIG. 2A. Disc 26 has line feed tubes 28 positioned around the perimeter of disc blade 26 to receive multiple weed eater exiting lines 29 from feed mechanism 9, discussed hereinafter. In one embodiment, gearbox feed mechanism 9 is electric, but in another embodiment, gearbox 9 may be manual fed utilizing manual control 15.

FIG. 1 also shows another embodiment disc blade 26A where blades 33 are utilized in conjunction with the weed eater lines to provide two different types of cutting arrangements for simultaneous weed eater and cutting operation of brush, trees, or the like. Accordingly, the present invention provides not only lines for cutting but also blades on the disc.

As shown in FIG. 2A, in accord with one possible embodiment, the line may be received or stored within line housing 16 and may comprise spools of line, such as four spools of line, a single spool with four lines spooled thereon, or the like. A single line could also be used. However other housings, which may comprise spools of lines, such as four spools of line or a plurality of lines may be utilized. Weed eater line 42 exits housing 16 and enters rotating tube or drive or shaft 23 through feed mechanism 9 on an upper end of shaft 23. The line then departs from rotating tube or drive or shaft 23 through exits 34 on a lower portion of tube or shaft 23 advancing outward from shaft 23 through alignment guides 28. In one embodiment, four separate lines 42 may extend through rotating tubular or shaft 23 within smaller tubulars or the like. Dashed lines 44 may represent lines and/or the associated tubulars, or a single tubular. Control knob 15 is utilized to control the speed at which the line exits housing 40. The line feed mechanism may be manual and/or electric.

The feed line configuration keeps the weed eater lines 42 in a proper alignment, so as not to get tangled as apparatus 100 operates. The centripetal force acting on the exiting portion of lines 29 (see FIG. 1) acts to keep the lines in alignment. Accordingly, in one embodiment, the weed eater line may be fed through a cylindrical member or multiple tubulars as indicated at 44 disposed within shaft 23 to prevent tangling and obstruction of weed eater line 42. This arrangement allows a user operating lawnmower 13 to access housing 40 containing weed eater line from a riding position above cutting head portion 50, without having to stop and/or quit operating apparatus 100. This is believed to be a significant advantage over prior art devices. Access housing 40 may comprise access windows and the like for replacing line 42 in line storage 16, which may comprise spools of line.

In this depiction, housing 25 is partially cut-away to show the internal configuration of weed trimmer 100. Disc 26 is attached to rotating shaft 23 by aligning disc recess 32 with shaft key 24 and then securing disc 26 to rotating shaft 23 with bolt 31. In alternative embodiments, other fastening arrangements may be used. The outer portion of housing 25 is secured to bracket 7 and therefore does not rotate but the inner portion of housing 25 rotates with disc 26. The diameter of the inner and outer cylinders of housing 25 is relatively large. Thus, the disc is rotatably mounted for rotation with a very strong rotating mounting.

Housing 25 surrounds a lower portion of rotating shaft 23 and is buttressed on an upper end by bracket 7. In this embodiment, bracket 7 is disposed between housing 25 and trimmer pulley 10. Upper bearing 22 and lower bearing 21 between the inner and outer cylinders of housing 25 facilitate movement of shaft 23 during operation when powered by mower drive belt 3 to allow relative rotation between rotating shaft 23 and the outer portion of housing 25. As noted above, the inner portion of housing 25 rotates with shaft 23. Pulley 10 is keyed to attach with shaft 23 so that shaft 23 will rotate along with pulley 10 during operation, while the outer cylinder or housing 25 remains fastened to bracket 7 in a fixed position. The inner cylinder of housing 25 rotates. Disc blade 26 will spin during operation with the rotational speed of rotating shaft 23, whereby rotating shaft 23 is constrained to move within housing 25 assisted by upper bearing 22 and lower bearings 21.

The weed eater line, which may comprise four lines are fed from line storage 16 as indicated by lines 42. It will be appreciated that more or fewer lines 42 and/or tubes 44 may be utilized. Weed eater line 42 is preferably fed from line storage 16, which enters gearbox 9 aligned with rotating shaft 23. Gearbox 9 is attached to shaft 23 using shaft bolt 19 and keyed bracket 35 for proper alignment and fit with shaft 23. Shaft bolt 19 is configured to allow weed eater line to exit gearbox 9 and enter rotating shaft 23. Gearbox 9 further comprises friction rollers 12 to move weed eater line 42 forward through shaft 23.

A pressure spring, as indicated at 41, may be used in conjunction with the group of friction rollers 18 to apply consistent pressure to weed eater line 42 as it is manipulated within tubulars 44 of shaft 23. The manual feed control 18 is then used to operate gears on the friction rollers to move the line into rotating shaft 23.

In one embodiment, manual feed knob 15 is operatively connected to manual feed roller gear 37 which then engages at least one friction roller gear to manually control how much line is currently being used. Turning manual feed 15 in one direction releases more of weed eater line 29, while turning the opposite direction limits or even retracts weed eater line 42 into housing 40. In another embodiment, worm gears may be utilized in place of roller gears 12 to advance or retract weed eater line 42. In another embodiment, an electric feed 56 is used to control roller gears 12 and discussed in more detail in FIG. 3. If the electric feed is used, then manual control knob 15 is not used. Housing 40 may be utilized to store the excess portions of weed eater line within line housing 16 and protect the moving portions of trimmer apparatus 100.

Weed eater line 42 is fed from line housing 16 which is then inserted into the upper portion of the gearbox. Roller gears 12 are positioned on either side of axis 36 to engage line housing 16 and/or weed eater line 42 to advance and retain weed eater line 42, which may be contained in a smaller housing 40. Manual feed knob 15 is positioned outside of gearbox 9 to allow a user access to manually feed weed eater line 29 by advancing manual feed roller gear 37, which in turn advances rollers gears 12 in both directions. In this embodiment, manual feed knob 15 may further comprise support 59.

In yet another possible embodiment, an electric line feed is utilized. In this case it is not necessary to provide manual control 15. Power switch 17 is used to control electric motor 56, which is powered by battery 30 connected to battery box 39 and operatively connected with brush 20 and electric motor 56 to electronically increase or decrease the length of weed eater line 29. Brush 20 is wired with gearbox 9 so that a user may electrically control the amount of weed eater line 29 being used in apparatus 100. Weed eater line 42 will be advanced along axis 36 before exiting shaft exit 34 and being inserted through alignment feeds 28, which keep weed eater line 42 in a desired position during operation of trimmer apparatus 100. In one embodiment, only one tubular is utilized within rotating tube or shaft 23 for multiple lines but in another embodiment there are as many tubulars as lines.

Figure 2B:
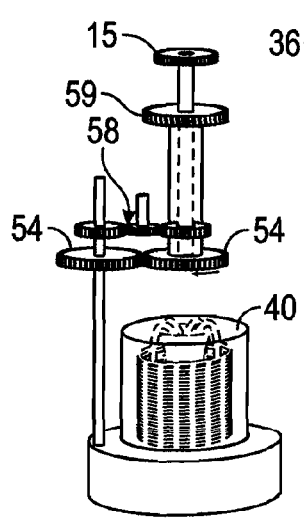
FIG. 2B is a side view of a gearbox for a weed trimmer and edger attachment in accord with one possible embodiment of the present invention.

Looking now to FIG. 2B, an enlarged view of the manual control gearbox and its components are depicted. Gears 54 and idler gears 58 may be used in conjunction with manual feed control 15 to advance weed eater line through shaft 23 by rotating friction rollers 12 as discussed above either forward or reverse. The line in dash is shown stored within an embodiment of housing 40. Thus, rotating manual control knob 15, rotates friction rollers 12 utilizing gears mounted on the friction rollers as shown in FIG. 2A.

FIG. 3 is a perspective view of a portable weed trimmer and edger attachment 100 in accord with one possible embodiment of the present invention. In this embodiment, apparatus 100 is a standalone product powered by AC power through cord 49. Trimmer 100 comprises extension pole 48 for manipulating the placement and orientation of disc blade 26 with respect to a cutting surface. This embodiment also comprises electric motor 46 contained within housing 25, rather than belts and pulleys as discussed previously in connection to FIGS. 1 & 2, to provide the rotational power to energize disc blade 26.

As discussed in reference to FIG. 2A, disc 26 is attached to shaft 23 by aligning disc recess 32 with shaft key 24 and then securing disc 26 to shaft 23 with bolt 31. In alternative embodiments, other fastening arrangements may be used to fasten disc blade 26 to shaft 23, so that disc blade 26 moves when shaft 23 rotates. In one embodiment, disc blade 26 may further comprise edges 33 arranged along the perimeter of disc 26 for housing 25 surrounds a lower portion of shaft 23 and houses electric motor 46 to provide the rotational power for disc 26. There is upper bearing 22 and lower bearing 21 disposed within housing 25 (See FIG. 2), which facilitates movement of shaft 23 within housing 25 during operation when powered on by motor 46. During operation, housing 25 remains stationary while disc blade 26 will spin during operation in relation to the rotational speed of shaft 23.

In an automatic feed embodiment, power switch 17 is operatively connected to both AC cord 49 and with brush 20 to control forward movement of weed eater line. AC cord also provides the power for electric motor 46. Brush 20 is wired with gearbox 9 so that a user may electrically control the amount of weed eater line being used in apparatus 100 to cut trees, weeds, grass, flowers, and the like.

In an alternative embodiment of an electric feed instead of a manual feed using control 15, electric motor 56 connects with switch 17 and with brush 20 to provide forward and reverse movement of weed eater line 29. Weed eater line 29 will be advanced along axis 36 through inner recess 44 of shaft 23 before exiting shaft exit 34 and being inserted through alignment feeds 28 which keep weed eater line 29 in a desired position during operation of trimmer apparatus 100. As discussed hereinabove, electric motor 46 is also powered by cord 49 in this embodiment.

Weed eater line is preferably fed from line storage 16 and enters gearbox 9 aligned with shaft 23. Gearbox 9 is attached to shaft 23 using shaft bolt 19 and keyed bracket 35 for proper alignment and fit with shaft 23. Shaft bolt 19 is configured to allow weed eater line 29 to exit gearbox 9 and enter shaft 23.

In a preferred embodiment, gearbox 9 further comprises gear controlled friction rollers 12 which engage line 42 from line storage 16 to advance or slow weed eater line 42 through shaft 23. If used, then manual feed knob 15 is operatively connected to manual feed roller gear 37 which then engages roller gears 12 to manually control how much line is currently being used. Turning manual feed 15 in one direction releases more of weed eater line 29, while turning the opposite direction retracts weed eater line 29 into housing 40.

Accordingly, in one embodiment, friction roller drive assembly 18 controls roller drives 12 to feed weed eater line 29 through apparatus 100. In another embodiment, worm gears may be utilized in place of or in combination with roller gears 12 to advance or retract weed eater line 29. In another embodiment, the gears are not utilized but instead motor 56 may be utilized to advance or retract the line.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

The invention claimed is:

1. A weed trimmer and edger apparatus, comprising:
   a shaft, said shaft being straight and rotatable;
   a compartment housing mounted on an upper end of said shaft and at least one cutting line exit on a lower end of said shaft, said compartment housing containing at least one access point to feed at least one strand of cutting line through said shaft and exiting through said at least one cutting line exit;

a disc fastened to a bottom portion of said shaft, said disc comprising at least one cutting line guide on an outer portion of said disc to receive said at least one strand of cutting line, said disc being flat and being mounted to receive said at least one strand of cutting line directly from said shaft;

a feed mechanism for moving said at least one strand of cutting line through said shaft, said feed mechanism operable to both extend and retract said at least one strand of cutting line; and a spring mounted bracket mounted to a lawnmower on one end and attached to a housing on an opposite end, at least one pulley and at least one drive belt operatively configured with said shaft and said lawnmower, whereby said shaft is slave controlled by said at least one drive belt to concentrically rotate within said housing, a manual control for said feed mechanism being mounted above said at least one pulley.

2. The weed trimmer and edger apparatus of claim 1, wherein said feed mechanism further comprises a gearbox comprising at least two feed members, said at least two feed members being controllable for controlling the length of said at least one strand of cutting line, and further comprising at least one pair of friction rollers.

3. The weed trimmer and edger apparatus of claim 1, further comprising a blade secured around said disc.

4. The weed trimmer and edger apparatus of claim 3, wherein said blade further comprises a plurality of cutting surfaces extending outward from a perimeter portion of said disc.

5. The weed trimmer and edger apparatus of claim 1, further comprising at least one battery and an electronic switch operatively connected to both said at least one battery and said feed mechanism, whereby said electronic switch electrically controls said feed mechanism to move said at least one strand of cutting line.

6. The weed trimmer and edger apparatus of claim 1, further comprising a stationary housing encompassing a lower portion of said shaft, said stationary housing further comprising an electric motor for rotating said shaft, whereby said shaft is driven by said electric motor to concentrically rotate within said stationary housing to engage a surface to be cut.

7. A method for a weed trimmer and edger apparatus, comprising:

providing a shaft, said shaft being straight;

mounting a compartment housing on an upper end of said shaft and at least one cutting line exit on a lower end of said shaft, said compartment housing containing at least one access point to feed at least one strand of cutting line through said shaft and exiting through said at least one cutting line exit;

fastening a disc to an underside of said shaft, said disc comprising at least one cutting line guide on an outer portion of said disc to receive said at least one strand of cutting line;

providing that said disc is flat and is mounted for receiving said at least one strand of cutting line directly from said at least one cutting line exit from said shaft;

providing a feed mechanism for moving said at least one strand of cutting line through said shaft; and providing a bracket mounted to a lawnmower on one end and attached to a housing on an opposite end, said housing concentrically encompassing a lower portion of said shaft, and further providing at least one pulley and at least one drive belt operatively configured with said shaft and said lawnmower, whereby said shaft is slave controlled by said at least one drive belt to concentrically rotate within said housing and mounting a manual control for said feed mechanism above said at least one pulley.

8. The method of claim 7, further comprising the step of providing said feed mechanism further comprises a gearbox comprising at least two feed members, said at least two feed members controllable for controlling the length of said at least one strand of cutting line.

9. The method of claim 7, further comprising securing a blade around said disc.

10. The method of claim 9, further comprising providing a plurality of cutting surfaces extending outward from a perimeter portion of said disc.

11. Said method of claim 7, further comprising providing at least one battery and an electronic switch operatively connected to both said at least one battery and said feed mechanism, whereby said electronic switch electrically controls said feed mechanism to move said at least one strand of cutting line.

12. Said method of claim 7, further comprising providing a stationary housing encompassing a lower portion of said shaft, said stationary housing further comprising an electric motor for rotating said shaft, whereby said shaft is driven by said electric motor to concentrically rotate within said stationary housing to engage a surface to be cut.

13. Said method of claim 7, further comprising providing a cylindrical member within said shaft for securing said at least one strand of cutting line.

14. A weed trimmer and edger apparatus, comprising:

a shaft, said shaft being straight and rotatable;

a compartment housing mounted on an upper end of said shaft and at least one cutting line exit on a lower end of said shaft, said compartment housing containing at least one access point to feed at least one strand of cutting line through said shaft and exiting through said at least one cutting line exit;

a disc fastened to a bottom portion of said shaft, said disc comprising at least one cutting line guide on an outer portion of said disc to receive said at least one strand of cutting line, said disc being flat and being mounted to receive said at least one strand of cutting line directly from said shaft;

a feed mechanism for moving said at least one strand of cutting line through said shaft, said feed mechanism operable to both extend and retract said at least one strand of cutting line; and said feed mechanism further comprises a gearbox comprising at least two feed members, said at least two feed members being controllable for controlling the length of said at least one strand of cutting line, and further comprising at least one pair of friction rollers.

15. The weed trimmer and edger apparatus of claim 14, further comprising a blade secured around said disc.

16. The weed trimmer and edger apparatus of claim 14, further comprising at least one battery and an electronic switch operatively connected to both said at least one battery and said feed mechanism, whereby said electronic switch electrically controls said feed mechanism to move said at least one strand of cutting line.

17. The weed trimmer and edger apparatus of claim 14, further comprising a stationary housing encompassing a lower portion of said shaft, said stationary housing further comprising an electric motor for rotating said shaft, whereby said shaft is driven by said electric motor to concentrically rotate within said stationary housing to engage a surface to be cut.

\* \* \* \* \*